United States Patent [19]

Savariar

[11] Patent Number: 5,235,019

[45] Date of Patent: Aug. 10, 1993

[54] PROCESS FOR PREPARATION OF POLY(ARYL ETHER) POLYMERS BY MACRO MONOCYCLIC CATALYSTS

[75] Inventor: Selvaraj Savariar, Duluth, Ga.

[73] Assignee: Amoco Corporation, Chicago, Ill.

[21] Appl. No.: 815,241

[22] Filed: Dec. 31, 1991

[51] Int. Cl.$^5$ .................. C08G 8/02; C08G 14/00; C08G 65/40

[52] U.S. Cl. .................. 528/125; 528/126; 528/128; 528/171; 528/174; 528/175; 528/219; 528/220

[58] Field of Search ............. 528/125, 126, 128, 174, 528/171, 175, 219, 220

[56] References Cited

U.S. PATENT DOCUMENTS

| | | | |
|---|---|---|---|
| 3,065,205 | 11/1962 | Bonuer | 528/180 |
| 3,264,536 | 8/1966 | Robinson | 528/125 |
| 3,562,295 | 2/1971 | Pedersen | 562/468 |
| 3,686,225 | 8/1972 | Pedersen | 562/468 |
| 3,941,748 | 3/1976 | King | 528/125 |
| 4,108,837 | 8/1978 | Johnson | 528/126 |
| 4,169,178 | 9/1979 | Freeman | 528/126 |
| 4,175,175 | 11/1979 | Johnson | 528/125 |
| 4,176,222 | 11/1979 | Cinderey | 528/125 |
| 4,256,859 | 3/1981 | Woo | 549/351 |
| 4,273,712 | 6/1981 | Williams, III | 562/468 |
| 4,287,125 | 9/1981 | Soula | 549/451 |
| 4,320,224 | 3/1982 | Rose | 528/126 |
| 4,343,445 | 5/1982 | Soula | 556/1 |
| 4,362,857 | 12/1982 | Yonezawa | 528/174 |
| 4,447,585 | 5/1984 | Parker | 525/385 |
| 4,460,778 | 7/1984 | Brunelle | 546/304 |
| 4,474,963 | 10/1984 | Gokel | 549/353 |
| 4,478,983 | 10/1984 | Parker | 525/385 |
| 4,544,710 | 10/1985 | Parker | 525/385 |
| 4,595,760 | 6/1986 | Brunelle | 546/256 |
| 4,638,044 | 1/1987 | Kelsey | 528/125 |
| 4,656,295 | 4/1987 | Gamon | 549/352 |
| 4,681,949 | 7/1987 | Brunelle | 548/461 |

FOREIGN PATENT DOCUMENTS 847963 7/1970 Canada .

*Primary Examiner*—John Kight, III
*Assistant Examiner*—P. Hampton-Hightower
*Attorney, Agent, or Firm*—Richard J. Schlott; Stephen L. Hensley; Frank J. Sroka

[57] ABSTRACT

An improved process for the preparation of poly(aryl ether) polymers by reacting, in the absence of dipolar aprotic solvents, an alkali metal double salt of a dihydric phenol with a dihalobenzenoid compound in the presence of a macrocyclic polyether compound having one ether ring in which oxygen atoms are separated one from the other by 2 to 3 carbon atoms, the ring having fused thereto from 0 to 4 monocyclic or polycyclic aromatic or saturated hydrocarbon nuclei. The nuclei are attached by vicinal carbon atoms thereof to adjoining ring oxygens in oxygen-carbon-carbon-oxygen arrangement.

The poly(aryl ether) polymer resins produced by the process have a low degree of coloration and excellent mechanical and electrical properties which allow them to be molded into a variety of articles.

35 Claims, No Drawings

PROCESS FOR PREPARATION OF POLY(ARYL ETHER) POLYMERS BY MACRO MONOCYCLIC CATALYSTS

FIELD OF THE INVENTION

This invention relates to an improved process for preparation of poly(aryl ether) polymers by reaction of alkali salts of phenols with halides using preselected monocyclic macrocyclic compounds as catalyst, but without a polar aprotic solvent. More particularly, this invention relates to reacting an alkali metal double salt of a dihydric phenol with a dihalobenzenoid compound in the presence of a macrocyclic polyether compound having one ether ring in which oxygen atoms are separated one from the other by 2 to 3 carbon atoms, the ring having fused thereto from 0 to 4 monocyclic or polycyclic aromatic or saturated hydrocarbon nuclei. The nuclei are attached by vicinal carbon atoms thereof to adjoining ring oxygens in oxygen-carbon-carbon-oxygen arrangement. The polymerization proceeds at temperatures in a range upward from about 100° C. and below the decomposition temperatures of the polymer formed, the reactants, the catalyst, and the polymerization solvent, if any, employed.

The poly(aryl ether) polymer resins produced by the process of this invention are tough, rigid, high mechanical strength thermoplastics which maintain their properties over a wide temperature range of from −100° C. to above 150° C. They have a low degree of coloration. They are hydrolytically stable and excellent in properties which allow them to be molded into a variety of articles.

BACKGROUND OF THE INVENTION

Poly(aryl ether) polymer resins comprise ether groups linking together various functional groups and aromatic radicals, such as phenylene, substituted phenylene, biphenylene, naphthylene.

Over the years, there has been developed a substantial body of patent and other literature directed to the formation and properties of poly(aryl ether) polymers. Processes for the preparation of poly(aryl ether) polymers may be divided into two general classes by method of reaction employed: the electrophilic aromatic substitution method and the nucleophilic aromatic substitution method.

Some of the earliest work, such as by Bonner, U.S. Pat. No. 3,065,205, involves the electrophilic aromatic substitution (viz. Friedel-Crafts-catalyzed) reaction of aromatic diacylhalides with unsubstituted aromatic compounds, such as diphenyl ether. In accordance with this method, polymerization proceeds with liberation of hydrogen halide by a Friedel-Crafts-catalyzed reaction in which an aromatic ring hydrogen is substituted with a cationic species derived from the corresponding acyl halide by use of a Lewis acid catalyst such as aluminum chloride, boron trifluoride or hydrogen fluoride. As is easily understood, this method, however, has disadvantages from a commercial viewpoint because it needs more than a stoichiometric amount of a highly corrosive Lewis acid. Furthermore, electrophilic aromatic substitution methods do not have sufficient versatility for linking aromatic nuclei and freedom from side reactions to effect synthesis of a wide range of high molecular weight polymers.

The evolution of the class of polymers provided by electrophilic aromatic substitution methods to a much broader range of poly(aryl ether) polymers was achieved by Johnson et al., Journal of Polymer Science, A-1, Vol. 5, 1967, pp. 2415–2427; Johnson et al., U.S. Pat. Nos. 4,108,837 and 4,175,175. Johnson et al. show that a very broad range of poly(aryl ether) polymers can be formed by the nucleophilic aromatic substitution (solution condensation polymerization) reaction of an activated aromatic dihalide and an aromatic diol in a substantially anhydrous dipolar aprotic solvent at elevated temperature. Ether bonds are formed via displacement of halogen by phenoxide anions with removal of halogen as alkali metal halide. Polycondensations in accordance with this method are, usually, performed in certain sulfoxide or sulfone solvents and the use of these dipolar aprotic solvents is an important feature of the process. The anhydrous dipolar aprotic solvents dissolve both the reactants and the polymers, and their use to enhance the rates of substitution reactions of this general type is well known. By this method, Johnson et al. created a host of new poly(aryl ether) polymers including broad classes of poly(aryl ether ketone) and poly(aryl ether sulphone) polymers which are acceptable for use under stress at high temperatures, often in excess of 150° C., and display thermoplasticity below their temperature of decomposition, but well above 150° C.

Thus, poly(aryl ether) polymers are well known; they can be synthesized from a variety of starting materials; and they can be made with different melting temperatures and molecular weights. Most interesting of the poly(aryl ether) polymers are crystalline, and at sufficiently high molecular weights, they are tough, i.e., they exhibit high values (>50 foot-pounds per cubic inch) in the tensile impact test (ASTM D-1822). They have potential for a wide variety of uses, and their favorable properties class them with the best of the engineering polymers.

There are many patents disclosing nucleophilic aromatic substitution methods for preparing polyarylene polyethers. For example, U.S. Patent Nos. 4,108,837 and 4,175,175 describe the preparation of polyarylene polyethers, and in particular, polysulfones. Several one-step and two-step processes are described in these patents. In a one-step processe, a double alkali metal salt of a dihydric phenol is reacted with a dihalobenzenoid compound in the presence of sulfone or sulfoxide solvents under substantially anhydrous conditions.

In a two-step process, a dihydric phenol is first converted, in situ, in the presence of a sulfone or sulfoxide solvent to the alkali metal salt by reaction with an alkali metal or alkali metal compound. After removing water, a dihalobenzenoid compound is reacted with the double salt. Further, the alkali metal salt of the dihydric phenol may be added in the solvent to the dihalobenzenoid compound either continuously, incrementally or all at once to achieve the polymerization reaction. Several other variations of the process are described in the patents.

Canadian Patent No. 847,963 describes a process for preparing polyarylene polyethers. The process comprises contacting equimolar amounts of dihydric phenol and a dihalobenzenoid compound and at least one mole of an alkali metal carbonate per mole of dihydric phenol. The dihydric phenol is reacted in situ with the alkali metal carbonate to form the alkali metal salt thereof, and the formed salt reacts with the dihalobenzeoid compound to form the polyarylene polyether in the usual fashion.

U.S. Pat. No. 4,176,222 describes the preparation of aromatic polyethers containing $SO_2$ and/or CO linkages by a nucleophilic reaction utilizing a mixture of sodium carbonate or bicarbonate and a second alkali metal carbonate or bicarbonate. The alkali metal of the second alkali metal carbonate or bicarbonate has a higher atomic number than that of sodium. The second alkali metal carbonate or bicarbonate is used in amounts such that there are 0.001 to 0.2 gram atoms of the alkali metal of higher atomic number per gram atom of sodium. The process is stated to take place faster when the combination of sodium carbonate or bicarbonate and the second alkali metal carbonate or bicarbonate are used. Also, the products are stated to be of higher molecular weight using such a combination.

The patent describes in Example 17 that when the reaction is carried out using only sodium carbonate, a polymer is obtained having a reduced viscosity of 0.60 deciliter per gram as measured in concentrated sulfuric acid at 25° C. at a concentration of one gram per 100 milliliters. However, it is stated in the patent that when the polymer was compression-molded into a film, the film was brittle and dark grey in color. In Example 18 of the patent, the polymerization was carried out using potassium carbonate instead of sodium carbonate and a high molecular weight polymer was produced (reduced viscosity of 1.55 as measured in concentrated sulfuric acid at 25° C. at a concentration of one gram per 100 milliliters). However, the polymer was stated to contain a quantity of gel, and also, the reaction vessel had acquired a black coating. In Example 19 of the patent, a mixture of potassium carbonate and sodium carbonate was used. The patent stated that the polymer produced had a high reduced viscosity and that a tough off-white film was formed from it. Also, no gel was present in the polymer and the reaction vessel had not become discolored.

U.S. Pat. No. 4,320,224 also describes the production of aromatic polyetherketones in the presence of an alkali metal carbonate or bicarbonate in an amount providing at least 2 gram atoms of alkali metal per mole of starting bisphenol. The patent states that the sole use of sodium carbonate and/or bicarbonate is excluded.

U.S. Pat. No. 3,941,748 describes the use of alkali metal fluoride for preparing polyarylethers. The process requires that sufficient fluoride be present so that the total fluoride available (including that from any fluoroaryl monomers) can be at least twice the number of phenol (—OH) groups. The examples show it to be, in general, a slow process.

Imai, et al., in Makromol Chem., 179, pp.2989-2991, 1978 describe the preparation of polysulfones in dipolar aprotic solvents using at least 500 mole percent of potassium fluoride based on the bisphenol. The process uses relatively low temperatures (about 100° C.) to avoid polymer degradation but requires very long reaction times (48 to 70 hours).

U.S. Pat. No. 4,169,178 refers to the British counterpart of U.S. Pat. No. 3,941,748, i.e., British Pat. No. 1,348,630. The patent states that the amount of alkali metal carbonate required may be reduced in the preparation of aromatic polyethers by employing fluorophenols or difluorobenzenoid compounds as part or all of the halogen-containing reactants. The patent states that the process gives faster reactions and higher molecular weights and less colored polymers than a process using potassium fluoride in place of potassium carbonate.

German Patent Application No. 3,342,433 describes a process for the preparation of aromatic polyethers which uses a mixture of (a) a lithium and/or an alkaline earth metal carbonate and (b) a sodium, potassium, rubidium and/or cesium carbonate. The patent application states that it was totally unexpected to discover that high molecular weight polymers can be prepared via the nucleophilic polycondensation if one uses the combination of the essentially nonreactive carbonates selected from the group of lithium or alkaline earth metal carbonates, with small amounts, that are per se insufficient to perform a successful polymerization of a carbonate selected from the group of sodium, potassium, rubidium or cesium carbonates.

European Patent Application No. 182,648 discloses a process for the preparation of an aromatic polymer which comprises (a) effecting the condensation of at least one halophenol; or (b) effecting the condensation of a mixture of at least one bisphenol with at least one dihalobenzenoid compound; or (c) effecting the condensation of (i) at least one halophenol and (ii) a mixture of at least one bisphenol with at least one dihalobenzenoid compound in the presence of at least a base and at least one copper compound wherein the base is in stoichiometric excess relative to the phenolic groups in (a), (b), or (c), at least one of the compounds in (a), (b), or (c) being a compound containing a ketone group, and in the halophenol or the dihalobenzenoid compound the, or each, halogen atom being activated by an inert electron-withdrawing group in at least one of the positions ortho- or para- to the, or each, halogen atom. The patent application states that polymers of increased molecular weight, as indicated by inherent viscosity, may be obtained from chlorine- or bromine-containing monomers or a polymer of the same molecular weight or may be obtained using a shorter polymerization time. Alkali metal hydroxides, carbonates or bicarbonates are cited as useful bases.

U.S. Pat. No. 4,638,044 describes the use of sodium carbonate or bicarbonate and an alkali metal halide selected from potassium, rubidium, or cesium fluoride or chloride or combinations thereof. This process still makes use of relatively high amounts of fluoride salts which are corrosive; moreover, the rates of polymerization are relatively low.

Johnson et al., Journal of Polymer Science, A-1, vol. 5, 1967, pp. 2375–2398, compared the reactivities of various activated aromatic dihalides with an alkali metal salt of bisphenol-A in a dimethylsulfoxide solvent and concluded that aromatic fluorides are much more reactive than aromatic chlorides having the same structure and produce polyethers having a higher degree of polymerization. From the viewpoint of reactivity, fluorides are preferred. In fact fluorides may be needed to provide a high molecular weight aromatic polyether, particularly where the aromatic halo compound does not contain a sufficiently highly electron withdrawing group in a para- or ortho-position relative to the halogen atoms and the halogen atoms, therefore, are not sufficiently activated. From an economic point of view, however, chloride compounds are more advantageous because of their low cost as compared with the corresponding aromatic fluoride compound.

Reactivity of the alkali metal salt of the aromatic hydroxy compound employed as the nucleophilic monomer is also significant. Commercially, sodium and/or potassium salts are usually used. Although sodium salts are advantageous from an economic point of view, potassium salts are often chosen because the nucleophilic properties of the phenoxide anion are excellent. In a particular case where an aromatic halo compound does not contain a highly electron withdrawing group in a para- or ortho-position relative to the halogen atoms, the halogen atoms are not sufficiently activated and, because of its low reactivity such aromatic chloro compound, a high molecular weight aromatic polyether cannot be obtained unless a potassium salt is used.

Nucleophilic aromatic substitution methods for preparing polyarylene polyethers, however, involve using dipolar aprotic solvents having high boiling points, such as dimethylformamide, N-methyl pyrolidirone, dimethyl sulfoxide and diphenyl sulfone. Thus, disadvantageously, it was necessary to use additional steps and time to isolate and purify the resulting polymers after completion of the reaction. Because of the necessity for removing by-produced salts and because of the problem regarding recovery of dipolar aprotic solvents having high boiling points, conventional prior methods have certain deficiencies and disadvantages, such as poor productivity and high costs.

Thus, there exists in the prior art a need for a manufacturing process for producing polyether resins which does not use dipolar aprotic solvents having high boiling points to produce the resin. A process for preparation of high molecular weight poly(aryl ether) polymers without need of polar aprotic solvents, expensive fluoro monomers, and/or potassium salts of phenols would be more particularly advantageous.

Accordingly, an object of the invention is to eliminate or reduce the aforementioned and other disadvantages and deficiencies of the prior art processes.

SUMMARY OF THE INVENTION

The objects of this invention are provided in a process for the preparation of poly(aryl ether) polymer resin having a basic structure comprising recurring units of the formula:

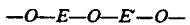

where E is the residuum of a dihydric phenol and E' is the residuum of the benzenoid compound having an inert electron-withdrawing group in at least one of the positions ortho and para to the valence bonds; both of the residua are valently bonded to ether oxygens through aromatic carbon atoms, by reacting about equimolar amounts of (I) an alkali metal double salt of dihydric phenol of the formula:

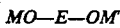

where M and M' are alkali metal ions selected from the group consisting of lithium, sodium, potassium and cesium ions with (II) a benzenoid compound of the formula:

where X and X' are halogen ions independently selected from the group consisting of fluorine and chlorine ions, in the presence of a selected macro monocyclic polyether compound catalyst. The process is conducted at conditions sufficient to effect formation of the desired poly(aryl ether) polymer resin, preferably at temperatures above about 100° C. and below the decomposition temperatures of the poly(aryl ether) polymer resin formed, reactants, catalyst, and solvent, if any, employed.

In one embodiment of the present invention the process comprises the steps of:
(a) reacting a dihydric phenol with about a stoichiometric amount of a source of alkali metal selected from the group consisting of alkali metal hydride, hydroxide, alkoxide or alkyl compounds in the presence of a solvent to form the alkali metal double salt of the dihydric phenol of the formula:

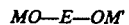

M and M' are alkali metal ions selected from the group consisting of lithium, sodium, potassium and cesium ions,
(b) removing water from the reacting mixture by codistillation with an azeotrope forming solvent, and
(c) admixing about an equimolar amount of a benzenoid compound of the formula:

where X and X' are halogen ions independently selected from the group consisting of fluorine and chlorine ions, in the presence of the macro monocyclic polyether compound catalyst, at temperatures above about 100° C. and below the decomposition temperatures of the poly(aryl ether) polymer resin formed, reactants, catalyst, and solvent, if any, employed.

It is desirable that the dihalobenzenoid compound and the alkali metal double salt of dihydric phenol be mixed in about equimolar amounts, i.e., the excessive amount of one component be not more than 5 mol percent of the equimolar amount.

Catalysts useful in this invention comprise a macrocyclic polyether (crown ether) compound having one ether ring in which oxygen atoms are separated one from the other by 2 to 3 carbon atoms, the ring having fused thereto from 0 to 4 monocyclic or polycyclic aromatic or saturated hydrocarbon nuclei. The nuclei are attached by vicinal carbon atoms thereof to adjoining ring oxygens in oxygen-carbon-carbon-oxygen arrangement. Preferred are the polyether compounds having one ether ring in which oxygen atoms are separated one from the other by 2 carbon atoms, the ring with and without having fused thereto 2 monocyclic aromatic or saturated hydrocarbon nuclei, particularly crown ether compounds selected from the group consisting of 12-crown-4, 15-crown-5, 18-crown-6, dibenzo-18-crown-6, and dicyclohexano-18-crown-6.

Catalysts to be used in the present invention can, advantageously, be in an immobilized form using any suitable inert support, such as anchored or bound to a synthetic resin. Catalysts in an anchored, bound, and immobilized forms are easily recovered after completion of the polymerization as by filtration and can be used repeatedly.

In other preferred embodiments of the process according to the present invention the benzenoid compound is a dichlorobenzenoid, more preferably the benzenoid compound is 4,4'-dichlorodiphenylsulfone and the alkali metal double salt is derived from 2,2-bis(hydroxyphenyl)-propane (bisphenol-A). One notable advantage of such process is the fact that dichlorobenzenoid compounds, which are less easily polymerized than their corresponding difluoro- compounds, can be used to obtain useful poly(aryl ether) polymer resins. As will be easily understood, that what can be a substantial commercial advantage is not obtained in cases using a difluorobenzenoid compound.

A notable advantage of a process according to the present invention is the fact that when a solvent is employed, it can be a nonpolar solvent, i.e., a solvent which, on a commercial scale, does not exhibit the disadvantages of the heretofore used polar aprotic solvents. It is even possible to use the dihalobenzenoid compound itself as the solvent in certain cases. It is obvious that it is also possible to use a polar solvent, although the commercial advantage is substantially less in this particular case.

BRIEF DESCRIPTION OF THE INVENTION

The polyarylene polyether resins which may be prepared by the improved process of this invention are linear, thermoplastic polyarlene polyethers wherein the arylene units are interspersed with ether, sulfone or ketone linkages. These resins may be obtained by reaction of an alkali metal double salt of a dihydric phenol and a dihalobenzenoid, either or both of which contain a sulfone or a ketone linkage, i.e., $-SO_2-$ or $-CO-$, between arylene groupings, to provide sulfone or ketone units in the polymer chain in addition to arylene units and ether units. The polymer has a basic structure comprising recurring units of the formula:

$$-O-E-O-E'-O-$$

where E is the residuum of a dihydric phenol and E' is the residuum of the benzenoid compound having an inert electron-withdrawing group in at least one of the positions ortho and para to the valence bonds; both of the residua are valently bonded to ether oxygens through aromatic carbon atoms.

Such aromatic polyethers are included within the class of polyarylene polyether resins described in U.S. Pat. No. 3,264,536, the disclosure of which is hereby incorporated herein by reference, for the purpose of describing and exemplifying E and E' in more detail. It is preferred that the dihydric phenol be a weakly acidic dinuclear phenol, such as, for example, the dihydroxy diphenyl alkanes or the nuclear halogenated derivatives thereof, such as, for example, the 2,2-bis(4-hydroxyphenyl)propane, 1,1-bis(4- hydroxyphenyl) 2-phenyl ethane, bis(4-hydroxyphenyl)methane, or their chlorinated derivates containing one or two chlorines on each aromatic ring. While these halogenated bisphenolic alkanes are more acidic than the nonhalogenated bisphenols and hence slower in reacting in this process, they do impart valuable flame resistance to these polymers. Other materials also termed appropriately "bisphenols" are also highly valuable and preferred. These materials are the bisphenols of a symmetrical or unsymmetrical joining group, as, for example, ether oxygen (—O—), carbonyl 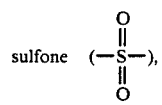

sulfide (—S—), sulfone 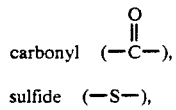

or hydrocarbon residue in which the two phenolic nuclei are joined to the same or different carbon atoms of the residue.

Such dinuclear phenols can be characterized as having the structure:

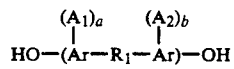

where Ar is an aromatic group and preferably is a phenylene group; $A_1$ and $A_2$ can be the same or different inert substituent groups, such as alkyl groups having from 1 to 4 Q carbon atoms, or alkoxy radicals having from 1 to 4 carbon atoms; a and b are integers having a value from 0 to 4, inclusive; and $R_1$ is representative of a bond between aromatic carbon atoms, such as in dihydroxy-diphenyl, or is a divalent radical, including, for example, radicals such as $-CO-$, $-O-$, $-S-$, $-SO-$, $-S-S-$, $-SO_2-$, and divalent hydrocarbon radicals, such as alkylene, alkylidene, cycloalkylene, cycloalkylidene, or the halogen, alkyl, aryl, or like substituted alkylene, alkylidene and cycloaliphatic radicals as well as aromatic radicals and rings fused to both Ar groups.

Examples of specific dihydric polynuclear phenols include among others:
bis-(hydroxyphenyl) alkanes such as;
2,2-bis-(4-hydroxyphenyl)propane,
2,4'-dihydroxydiphenylmethane,
bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3,hexafluoropropane,and the like;
di(hydroxyphenyl)sulfones, such as
bis-(4-hydroxyphenyl sulfone),
2,4'-dihydroxydiphenyl sulfone,
5-chloro-2,4'-dihydroxydiphenyl sulfone,
5'-chloro-4,4'-dihydroxydiphenyl sulfone; and
di(hydroxyphenyl)ethers, such as
bis-(4-hydroxyphenyl)ether,
4,3'-dihydroxydiphenyl ether,
4,2'-dihydroxydiphenyl ether,
2,2'-dihydroxydiphenyl ether,
2,3'-dihydroxydiphenyl ether,
4,4'-dihydroxy-2,6-dimethyldiphenyl ether,
bis-(4-hydroxy-3-isobutylphenyl)ether, bis-(4-hydroxy-3-isopropylphenyl) ether,
bis-(4-hydroxy-3-chlorophenyl) ether,
bis-(4-hydroxy-3-fluorophenyl) ether,
bis-(4-hydroxy-3-bromophenyl) ether,
bis-(4-hydroxynaphthyl) ether,
bis-(4-hydroxy-3-chloronaphthyl) ether,
4,4'-dihydroxy-3,6-dimethoxydiphenyl ether.

As used herein the E term, defined as being the "residuum of the dihydric phenol," of course refers to the residue of the dihydric phenol after the removal of the two aromatic hydroxyl groups. Thus, as is readily seen, these polyarylene polyethers contain recurring groups of the residuum of the dihydric phenol and the residuum of the benzenoid compound bonded through aromatic ether oxygen atoms.

Any dihalobenzenoid compound or mixtures thereof can be employed in this invention which compound or compounds have the two halogens bonded to benzene rings having an electron-withdrawing group in at least one of the positions ortho and para to the halogen. The dihalobenzenoid compound can be either mononuclear where the halogens are attached to the same benzenoid ring or polynuclear where they are attached to different benzenoid rings, as long as there is an activating electron- withdrawing group in the ortho or para position of that benzenoid nucleus. Fluorine and chlorine-substituted benzenoid reactants are preferred: the fluorine compounds for fast reactivity and the chlorine compounds for their inexpensiveness.

Any electron-withdrawing group can be employed as the activator group in these compounds. It should, of course, be inert under the reaction conditions, but otherwise its structure is not critical. Preferred are the strong activating groups such as the sulfone group

bonding two halogen benzenoid nuclei as in 4,4'-dichlorodiphenyl sulfone and 4,4'-difluorodiphenyl sulfone, although such other strong withdrawing groups hereinafter mentioned can also be used with equal ease.

The more powerful of the electron-withdrawing groups give the fastest reactions and hence are preferred. It is further preferred that the ring contain no electron-supplying groups on the same benzenoid nucleus as the halogen; however, the presence of other groups on the nucleus or in the residuum of the compound can be tolerated. Preferably, all of the substituents on the benzenoid nucleus are either hydrogen (zero electron-withdrawing) or other groups having a positive sigma value, as set forth by J. F. Bunnett et al., in *Chemical Review*, Vol. 49, pp. 274–412 (1951). See also Taft, *Steric Effects in Organic Chemistry*, John Wiley & Sons (1956), chapter 13; *Chemical Review*, Vol. 53, 222; JACS, 74, 3120; and JACS, 75, 4231.

If desired, polymers may be made with mixtures of two or more dihalobenzenoid compounds. Thus, the E' residuum of the benzenoid compounds in the polymer structure may be the same or different.

It is seen also that as used herein, the E' term defined as being the "residuum of the benzenoid compound," refers to the aromatic or benzenoid residue of the compound after the removal of the halogen atoms on the benzenoid nucleus.

A preferred form of the polyarylene polyethers of this invention are those prepared using the dihydric polynuclear phenols of the following four types, including the derivatives thereof which are substituted with inert substituent groups, such as

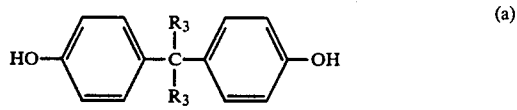 (a)

in which the $R_3$ group represents independently hydrogen, lower alkyl, aryl and the halogen-substituted groups thereof, which can be the same or different and in which each $R_3$ is preferably methyl;

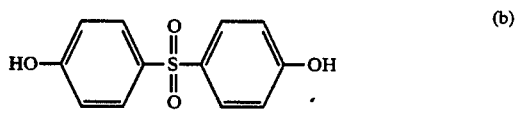 (b)

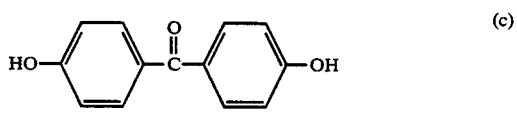 (c)

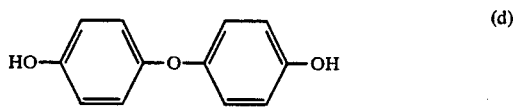 (d)

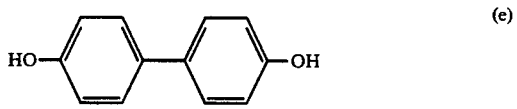 (e)

and substituted derivatives thereof.

It is also contemplated in this invention to use a mixture of two or more different dihydric phenols to accomplish the same ends as above. Thus, when referred to above, the E residuum in the polymer structure can actually be the same or different aromatic residua.

The virgin poly(aryl ether) polymer resins prepared by the improved process of this invention have a color factor, as measured on filtered resin reactor solutions, less than the color factor of resins prepared by processes which require the use of a polar aprotic solvent.

The preferred poly(aryl ether)s have repeating units of the formula:

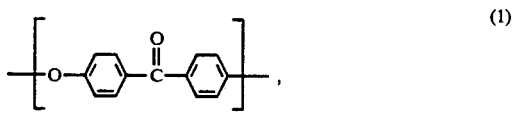 (1)

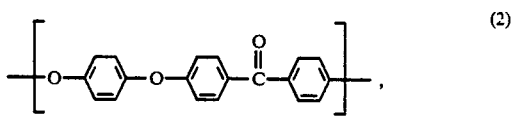 (2)

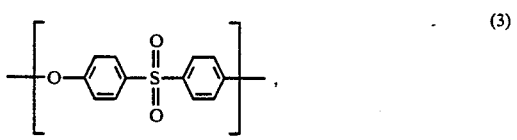 (3)

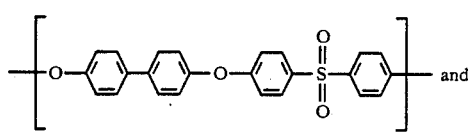

(4)

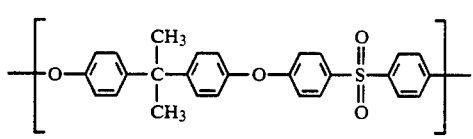

(5)

As indicated above, catalysts useful in this invention comprise a macrocyclic monocyclic polyether (crown ether) compound having one ether ring in which oxygen atoms are joined to adjoining oxygen atoms by hydrocarbon chains having from 2 to 3 carbon atoms, the ring having fused thereto from 0 to 4 monocyclic or polycyclic aromatic or saturated hydrocarbon nuclei. These nuclei are attached by vicinal carbon atoms thereof to adjoining ring oxygens in oxygen-carbon-carbon-oxygen arrangement. Ring carbon atoms can be $C_1$ to $C_4$ alkyl substituted. These macro monocyclic polyether compounds are disclosed and claimed in U.S. Pat. Nos. 3,562,295 and 3,686,225 in the name of Pederson, the disclosures of which are hereby incorporated by reference. Preferred are the polyether compounds having one ether ring in which oxygen atoms are linked by hydrocarbon chains having from 2 carbon atoms in the ether ring with and without having fused thereto 2 monocyclic aromatic or saturated hydrocarbon nuclei. Preferred are crown ether compounds selected from the group consisting of the following structural formula:

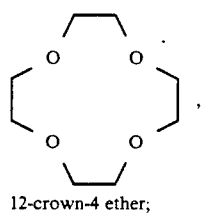

12-crown-4 ether;

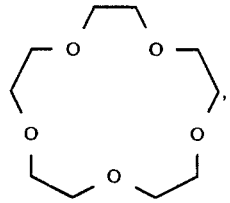

15-crown-5 ether;

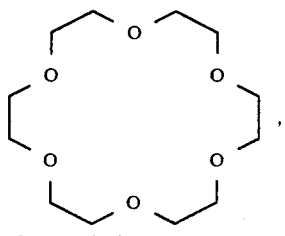

18-crown-6 ether;

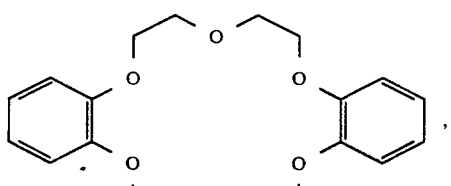

dibenzo-18-crown-6 ether; and

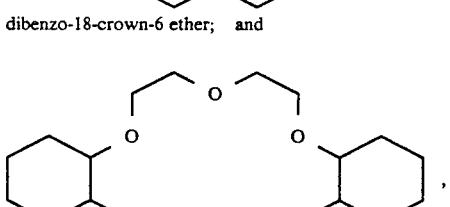

dicyclohexano-18-crown-6 ether.

Advantageously, a crown ether compound is selected to accommodate particular alkali metal double salts of dihydric phenols. Selection of the most suitable catalyst for carrying out the process according to the invention is made with regard to the size of the alkali metal cations M and M'. The larger effective radius of the cation, the greater must be the ether ring. Thus, 12-crown-4 is preferred where M and M' are lithium ions, 15-crown-5 is preferred where M and M' are sodium ions and 18-crown-6, dibenzo-18-crown-6, and/or dicyclohexano-18-crown-6 is preferred where M and M' are potassium ions.

Any catalytically effective amount of catalyst may be used. Typically, an effective amount is in a range from about 0.001 to about 0.2, preferably from about 0.01 to about 0.1.

The polyarylene polyether polymers can be prepared by the procedures as set forth in U.S. Pat. Nos. 4,108,837 and 4,175,175, i.e., by the substantially equimolar reaction of a double alkali metal salt of a dihydric phenol with a dihalobenzenoid compound; except that, in processes according to the present invention, the polar aprotic liquid organic solvent such as a sulfone or sulfoxide solvent is not required, because a preselected catalyst described herein is used for this reaction. The polymers may be prepared in a two-step process in which a dihydric phenol is first converted in situ in a liquid organic solvent to form a salt by the reaction with the alkali metal or alkali metal hydride, hydroxide, alkoxide or alkyl compounds. Preferably, the alkali metal hydroxide is employed. After removing the water which is present or formed, in order to secure the alkali metal salt at substantially anhydrous conditions, the polymer is formed by admixing and reacting about stoichiometric quantities of the dihalobenzenoid compound. Polyarylene polyethers are also prepared according to the present invention by simultaneously contacting about stoichiometric amounts of an alkali metal hydride, hydroxide, alkoxide or alkyl compound with a dihydric phenol in a solvent mixture comprising an azeotrope former or cosolvent and, if desired, a reaction solvent in a weight ratio of from about 10/1 to about 1/1, preferably from about 4/1 to about 3/1; removing water from the reaction mass by codistillation with the azeotrope-forming solvent until substantially anhydrous conditions are attained; where a reaction solvent is used, adjusting the ratio of azeotrope former to reaction solvent from about 1/1 to about 1/10, preferably from about ⅓ to about ¼, by removing excess azeotrope former; and reacting the alkali metal double salt with the dihalobenzenoid compound in a condensed phase, liquid and/or solid.

If a solvent is used, it can be a substantially non-polar organic liquid. Generally, in order to obtain the best results according to the invention, the reactions are carried out using an organic solvent. The identity of the liquid is not critical, provided it possesses the stated properties. It must solubilize the catalyst (the latter being soluble in a majority of customary solvents); it must also be chemically inert vis-a-vis the salts to be dissolved. Illustrative liquids which can be used within the scope of the process according to the invention are: halogenated hydrocarbons, such as chlorobutane, chloroform, dichloroethane, benzyl chloride, methylene chloride, monochlorobenzene, and ortho-dichlorobenzene; aromatic hydrocarbons, such as benzene, toluene, o-, m- and p-xylene; and other solvents, such as anisole, nitromethane, and nitro benzene. These can be used singly or in combination of two or more.

In the polymerization reaction it is, typically, desirable that the reaction mixture be maintained substantially anhydrous before and during the polymerization reaction. While amounts of water up to about one percent can be tolerated, amounts of water substantially greater than this are desirably avoided as the reaction of water with the dihalobenzenoid compound leads to formation of phenolic species and only low molecular weight products are secured. Optimal amounts of water for various reacting systems are easily determined experimentally.

In situations where it is desired to prepare the alkali metal salt of the dihydric phenol in situ in a reaction solvent, the dihydric phenol and an alkali metal or alkali metal halide, hydroxide, alkoxide or alkali compounds are admixed in essentially stoichiometric amounts i.e., the excessive amount of one component be not more than 5 mol percent of the stoichiometric amount, and normal precautions taken to remove all the water of neutralization preferably by distillation of a water-containing azeotrope from the solvent-metal salt mixture.

It has been found convenient to employ benzene, xylene, halogenated benzenes, or other inert organic azeotrope-forming organic liquids in performing this reaction. Heating the alkali metal hydroxide, dihydric phenol and small amounts of the azeotrope former to reflux for several hours while removing the azeotrope is most desirable. However, it is obvious that any other technique for removing essentially all of the water can be equally satisfactory.

It is not essential and critical in this reaction that all of the azeotropic former be removed before the reaction of the alkali metal salt of the bisphenol with the dihalobenzenoid compound. In fact, it is desirable in some instances to employ an amount of such material in excess of that needed to azeotrope off all of the water, with the balance being used as a principal reaction solvent, a cosolvent, or inert diluent with a principal reaction solvent. Thus, for instance, benzene, heptane, xylene, toluene, chlorobenzene, dichlorobenzene and like inert liquids can be beneficially employed.

The azeotrope former can be either miscible or immiscible with a principal reaction solvent. If it is not miscible, it should be one which will not cause precipitation of the polymer in the reaction mass. Heptane is such a solvent. When employed, it will merely remain inert and immiscible in the reaction mass. If the azeotrope former would cause precipitation of the polymer, it should be removed almost completely from the reaction mass before initiating polymerization.

For such reasons, it is preferred to employ azeotrope formers which are miscible with the major solvents and which also act as cosolvents for the polymer during polymerization. Chlorobenzene, dichlorobenzene and xylene are azeotrope formers of this class. Preferably the azeotrope former should be one which boils below the decomposition temperature of the major solvent and which is perfectly stable and inert in the process, particularly inert to the alkali metal hydroxide when the alkali metal salt of the dihydric phenol is prepared in situ in the presence of the inert diluent or azeotrope former.

Chlorobenzene and o-dichlorobenzene serve particularly well as solvent or cosolvent. The halogenated benzenes, for example, not only permit the formed polymer to remain in solution and thus produce high molecular weight polymers, Q but also provide a very economical processing system and an effecting dehydration operation.

Any of the alkali metals or alkali metal hydrides, hydroxides, alkoxides or alkyl compounds can be employed in this technique. Alkali metal hydroxides are preferred. Potassium and cesium salts have been found to react considerably faster than the sodium salts, but due to expense of the cesium salts, the sodium or potassium salts are preferred. As heretofore indicated, the alkali metal salt should, of course, be the double metal salt, i.e., both aromatic hydroxyl groups being saponified, in order to prepare these products. Single metal salts ordinarily limit the molecular weight of the product. While this may be desirable as a chain terminator or molecular weight regulator near the end of the reaction period, the initial reaction and the major portion thereof should be with the double alkali metal salt of the dihydric phenol. The alkali metal moieties of this compound, however, can be the same or different alkali metals.

In the process of this invention, the alkali metal or alkali metal hydride, hydroxide, alkoxide or alkyl compound is then added and reacted with the dihydric phenol to form its alkali metal double salt. The mixture is heated and codistilled with solvent to remove water from the reacting mixture. During the early stages of codistillation, a cosolvent, if any, can be added to the reaction mixture A dihalobenzenoid compound is added with a preselected macro monocyclic compound, and the polymerization takes place as described above.

In a process according to the present invention, it is preferable that the presence of oxygen be kept minimal during the formation and dehydration of the alkali metal salt of the dihydric phenol. Therefore, a nitrogen purge of the initial reactor charge is helpful in minimizing the presence of oxygen. Also, sparging nitrogen into the reaction vessel during the simultaneous addition of the solvent and the alkali metal or alkali metal hydride, hydroxide, alkoxide or alkyl compound, facilitates oxygen removal from the reactor.

The alkali metal or alkali metal hydride, hydroxide, alkoxide or alkyl compounds are preferably added to the dihydric phenol at a reactor temperature of from about 40° to about 60° C. The alkali compounds are added such that the stoichiometry of alkali compounds to dihydric phenol is from about 99.2 percent to about 99.7 percent. Stoichiometry below about 99.2 percent and above about 99.7 percent tends to promote color generation.

The polymerization reaction, i.e., the reaction between the alkali metal salt of the dihydric phenol and the dihalobenzenoid compound, is carried out at temperatures in a range upward from about 100° C. and below the decomposition temperatures of the polymer formed, the reactants, the catalyst, and the polymerization solvent, if any, employed.

The polymerization temperature employed is, typically, in a range from about 100° C. to about 400° C. and will depend on the nature of reactants and solvent, if any, is used. For example, in the preparation of polysulfones in chlorobenzene and/or o-dichlorobenzene, this temperature is in the range of from about 100° to about 210° C., preferably from about 120° to about 190° C. more preferably about 130° C to about 180° C. For production of the ketone analogues, temperatures in excess of 250° C., preferably above 270° C., are generally desirable. The reaction is carried out from about ¼ to about 25 hours, preferably from about ½ to about 10 hours.

To minimize cleavage reactions, it is preferred that the maximum polymerization temperature is below 350° C. and in particular is the lowest that gives a convenient polymerization time. For the production of some polymers, it may be desirable to commence polymerization at one temperature, e.g. between 150° C. and 200° C., and to increase the temperature as polymerization ensues. This is particularly advantageous when making polymers having only a low solubility in the solvent. In that case it is desirable to increase the temperature progressively to maintain the polymer in solution as its molecular weight increases.

Where solvent is employed, the temperature should be sufficient to maintain the reactants and/or the polymer produced therefrom, in the molten state.

In a further embodiment of this invention, a fractionation column can be used to facilitate dehydration of the polyarylether reaction system, i.e., to remove the water formed during the reaction between the alkali metal compounds and the dihydric phenol. A fractionation column facilitates water removal from the azeotrope former/water/solvent mixture boiled-up during dehydration, shortens the time required to effect batch dehydration, and minimizes the boil-up and subsequent removal of the reaction solvent from the polyarylether reaction mixture, thereby affording a reduction in the total solvent reactor charge. The higher solvent reactor concentrations which arise through the use of a fractionation column have been found to produce minimal polyarylether color formation when the improved processes of this invention are used together with a reduction in the solvent reactor charge.

The reduced viscosity of the resulting polymer can be suitably adjusted by changing kinds and amounts, i.e. mol ratio, of compounds used in the process. Typically, product polymers having reduced viscosity in a range of from 0.1 to about 1.5, measured as a 0.2 percent solution in chloroform at 25° C., are easily obtained. Polymers having a reduced viscosity of 0.2 or more are preferred from a standpoint of mechanical and electrical properties of the polymer.

The present invention is described in greater detail with reference to the following actual examples of the invention and comparative examples. These examples, are for illustrative purposes and are not to be construed to be limiting of the invention.

Residual phenolic concentrations were measured by a non-aqueous titration using tetrabutyl ammonium hydroxide as base.

PREPARATIVE EXAMPLE 1

In this example the dipotassium salt hexahydrate was prepared from bisphenol-A. A 5 L, four-neck, round-bottom flask was equipped with a stainless steel stirrer, condenser, a nitrogen inlet, a thermocouple, and an addition funnel. The flask was Charged with bisphenol-A (228.28 g, 1.0 mole) and isopropanol (1 L). The contents were heated to reflux by a heating mantle. After cooling to 80° C., aqueous potassium hydroxide (45.7 w/wt. percent, 246.13 g) was added from an addition funnel. Without removing the mantle, the reaction was cooled to about 40° C. and then placed in an ice-bath. To help transfer the precipitates, ice-cold isopropanol (2 L) was added. The precipitates were filtered through a sintered funnel and washed with ice cold ether (2×1 L). The powder was rendered solvent-free by keeping it under vacuum above 100 mm Hg with nitrogen bleed at room temperature. The amount of phenoxide (4.84 milli eq/g) was measured by an acid-base titration which indicated a molecular weight of 413.22. The calculated molecular weight for the hexahydrate is 412.56.

EXAMPLE 1

A 100 mL, four-neck, round-bottom flask was equipped with a mechanical stainless steel stirrer through the center neck using a custom made brass adaptor. The left neck was attached to a Claisen adaptor through which were attached a stainless steel thermocouple and a vacuum jacketed vigreaux column. On top of the column were placed a two-way addition funnel and a water cooled condenser. The right neck was attached to a stainless steel nitrogen inlet.

The reactor was charged with bisphenol-A dipotassium salt hexahydrate (16.48 g, 40 mmol) and dichlorobenzene (40 mL). The slurry was degassed for 0.5 hour by bubbling prepurified nitrogen and the nitrogen flow was maintained throughout the reaction. The contents were heated in an oil bath to 180° C. to remove the water of hydration as an azeotrope. Water was discarded, but dichlorobenzene was returned to the pot. When all the water that could distill out azeotroped, a solution of dichlorodiphenyl sulfone (11.487 g, 40 mmol) and dicyclohexyl-18-crown-6 ether (0.744 g, 5 mole percent) in dichlorobenzene (20 mL) was added. The contents were kept at 180° C. for 20 hours. The resulting viscous solution was diluted with chlorobenzene containing glacial acetic acid (2 mL). The salts were filtered off through a medium porosity sintered funnel. The clear filtrate was added slowly to 5 volumes of methanol taken in a high speed blender. The fluff was isolated by filtration and dried at 110° C. under 50 mm Hg vacuum. The reduced viscosity of the fluff was 0.40 dL/g as measured as 0.2 g in 100 mL $CHCl_3$ at 25° C. The residual phenolic end-group was measured as 32 micro-eq/g by a non-aqueous titration using tetramethylammonium hydroxide as base.

EXAMPLE 2

This example was conducted in the same manner as Example 1, but with the following changes. 20.628 g of bisphenol-A dipotassium salt hexahydrate, 12.7125 g of 4,4'-difluorodiphenyl sulfone in the place of 4,4'- dichlorodiphenyl sulfone and 0.94 g of dicyclohexyl-18-crown-6 ether were used. A 3 1/2 hour reaction at 180° C. provided a viscous solution from which the polymer was recovered as in Example 2. The reduced viscosity of the polymer was measured to be 0.65 dL/g.

EXAMPLE 3

This example was conducted in the same manner as Example 1, but with the following changes. 16.48 g of bisphenol-A dipotassium salt hexahydrate, 10.17 g of 4,4'-difluorodiphenyl sulfone and 0.72 g of dibenzo-18-crown-6 ether in the place of dicyclohexyl-18-crown-6 were used. A 22 hour reaction at 180° C. provided a polymer of reduced viscosity as measured as 0.2 percent solution in CHCl$_3$ at 25° C. of 0.84 dL/g. This polymer contained a residual phenolic end-group of 16 micro-eq/g.

EXAMPLE 4

In a 100 mL reactor as described in Example 1 were placed bisphenol-A (11.414 g, 50 mmol) aqueous potassium hydroxide (12.550 g, 45.8 percent 100 mmol) and water (10 mL). The solution was degassed for 0.5 hour by bubbling prepurified nitrogen. After all bisphenol-A had dissolved, toluene (50 mL) was added. The degassing was continued for another 0.5 hour. The solution was heated to reflux in an oil bath to remove water azeotropically. Water was removed from the reaction whereas toluene was returned to the pot. When almost all water was removed (16 mL), a solution of 4,4'-dichlorodiphenyl sulfone (14.359 g, 50 mmol) and dicyclohexyl-18-crown-6 ether (0.93 g, 0.25 mmol) in dichlorobenzene (60 mL) was added. Toluene was removed to raise the temperature to 180° C. The reaction was held at 180° C. for 48 hours with intermittent scraping of the bisphenol A disalt by spatula to dislodge them from sticking to the flask. The resulting viscous solution was processed as in Example 1. The reduced viscosity of the polymer was 0.39 dL/g.

EXAMPLE 5

A 250 mL, four-neck, round-bottom flask was fitted with a nitrogen inlet, stainless steel stirrer, a thermocouple thermometer, a condenser and a stopper. The reactor was charged with bisphenol-A (11.414 g, 50 mmol), dichlorodiphenyl sulfone (14.358 g, 50 mmol), water (50 mL), chlorobenzene (50 mL) and dicyclohexyl-18-crown-6 ether (0.93 g, 5.5 mmol). After degassing for 0.5 hour, aqueous potassium hydroxide (45.8 percent, 12.22 g, 100 mmol) was added. About 5 mL water was used for washings. The flask was immersed in an oil bath and heated to 100° C. The reaction was held at 100° C. for 18 hours. After cooling to room temperature, chlorobenzene (150 mL) containing g-acetic acid (5 mL) was added. The aqueous phase was discarded. The organic phase was washed again with water. The polymer was recovered by coagulation into methanol. Reduced viscosity of the recovered polymer measured 0.37 dL/g and the yield of polymer was 64 percent of theoretical.

COMPARATIVE EXAMPLE A

A slurry of bisphenol-A dipotassium salt hexahydrate (16 48 g, 40 mmol) in dichlorobenzene (40 mL) was heated to reflux to remove azeotropable water. After 2 hours of reflux, a hot solution of 4,4-dichlorodiphenyl sulfone (11.487 g, 40 mmol) in chlorobenzene (20 mL) was added. About 100 mL chlorobenzene was added drop by drop over 2 hours to remove water. The precipitated salts never dissolved. After 4 hours of reaction at 180° C., glacial acetic acid (10 mL) in chlorobenzene was added. Upon stirring, a homogeneous solution was obtained. Coagulation of this solution into methanol did not provide polymer.

COMPARATIVE EXAMPLE B

The following control experiment was provided to show that polymerization takes place in dipolar aprotic solvents, specifically in dimethylacetamide, however, in the absence of a macro monocyclic polyether compound. Reactions run in dipolar aprotic solvents are not catalyzed reactions.

In a 500 mL, four-neck, round-bottom flask as equipped in Example 3 were placed bisphenol-A (45.656 g, 200 mmol), dichlorodiphenyl sulfone (57.436 g, 200 mmol), potassium carbonate (29.022 g, 210 mmol), toluene (75 mL) and dimethyl acetamide (200 mL). The reactor was placed in an oil bath and heated to 160° C. A reasonable reflux of toluene was maintained throughout the reaction. After 10 hours at 160° C., the reaction was diluted with chlorobenzene (300 mL) containing glacial-acetic acid (10 mL). The polymer was recovered as in Example 2. The reduced viscosity of the dried polymer was 0.45 dL/g measured as 0.2 g in 100 mL CHCl$_3$ at 25° C.

That which is claimed is:

1. A process for the preparation of poly(aryl ether) polymer resin having a basic structure comprising recurring units of the formula:

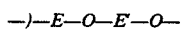

where E is the residuum of a dihydric phenol and E' is the residuum of the benzenoid compound having an inert electron-withdrawing group in at least one of the positions ortho and para to the valence bonds; both of the residua are valently bonded to ether oxygens through aromatic carbon atoms, which process comprises reacting about equimolar amounts of (I) an alkali metal double salt of dihydric phenol of the formula:

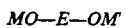

where M and M' are alkali metal ions selected from the group consisting of lithium, sodium, potassium and cesium ions with (II) a benzenoid compound of the formula:

where X and X' are halogen ions independently selected from the group consisting of fluorine and chlorine ions, in the presence of a monocyclic macrocyclic polyether compound having one ether ring in which oxygen atoms are joined to adjoining oxygen atoms by hydrocarbon chains having from 2 to 3 carbon atoms, the ring having fused thereto from 0- to 4 monocyclic or polycyclic aromatic or saturated hydrocarbon nuclei attached by vicinal carbon atoms thereof to adjoining ring oxygens in oxygen-carbon-carbon-oxygen arrangement, at temperatures in a range upward from about 100° C. and below the decomposition temperatures of the polymer formed, the reactants, the macrocyclic polyether compound, and wherein the monocyclic macrocyclic compound is in an immobilized form.

2. The process according to claim 1 wherein at least one ether ring carbon atom is $C_1$ to $C_4$ alkyl substituted.

3. The process according to claim 1 wherein the polyether compound is selected from the group consisting of crown ethers having the following structural formulae:

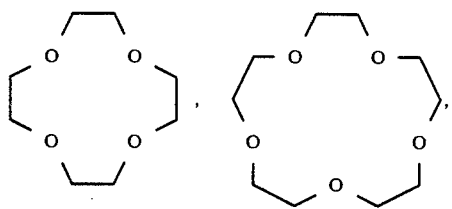

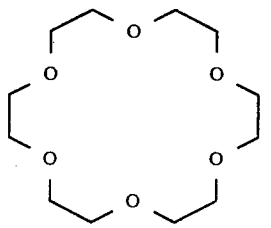

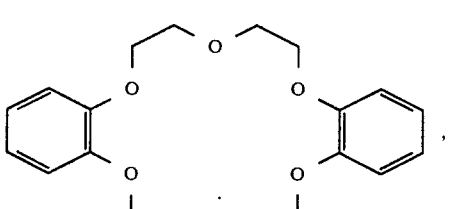

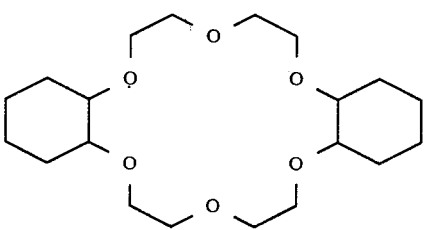

and

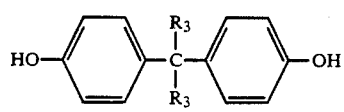

4. The process according to claim 3 wherein the alkali metal double salt is derived from a dihydric phenol selected from the group consisting of the formulae:

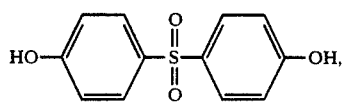 (a)

where $R_3$ represents the methyl radical,

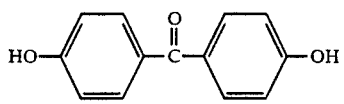 (b)

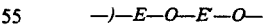 (c)

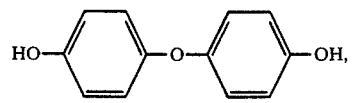 (d)

and

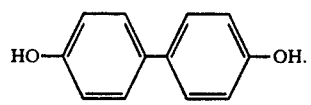 (e)

5. The process according to claim 4 wherein M and M' are lithium ions and wherein the polyether compound is 12-crown-4 ether.

6. The process according to claim 4 wherein M and M' are sodium ions and wherein the polyether compound is 15-crown-5 ether.

7. The process according to claim 4 wherein M and M' are potassium ions and wherein the polyether compound is selected from the group consisting of 18-crown-6 ether, dibenzo-18-crown-6 ether, dicyclohexano-18-crown-6 ether.

8. The process according to claim 7 wherein the benzenoid compound is 4,4'-dichlorodiphenyl sulfone.

9. The process according to claim 8 wherein the potassium salt is derived from bisphenol-A.

10. The process according to claim 9 wherein the polyether compound is dibenzo-18-crown-6 ether.

11. The process according to claim 3 wherein X and X' are chlorine ions.

12. The process according to claim 11 wherein M and M' are lithium ions and wherein the polyether compound is 12-crown-4 ether.

13. The process according to claim 11 wherein M and M' are sodium ions and wherein the polyether compound is 15-crown-5 ether.

14. The process according to claim 11 wherein M and M' are potassium ions and wherein the polyether compound is selected from the group consisting of 18-crown-6 ether, dibenzo-18-crown-6 ether, dicyclohexano-18-crown-6 ether.

15. The process according to claim 14 wherein the potassium salt is derived from bisphenol-A.

16. The process according to claim 15 wherein the benzenoid compound is 4,4'-dichlorodiphenyl sulfone.

17. The process according to claim 16 wherein the polyether compound is dibenzo-18-crown-6 ether.

18. A process for the preparation of poly(aryl ether) polymer resin having a basic structure comprising recurring units of the formula:

—)—E—O—E'—O— where E is the residuum of a dihydric phenol and E' is the residuum of the benzenoid compound having an inert electron-withdrawing group in at least one of the positions ortho and para to the valence bonds; both of the residua are valently bonded to ether oxygens through aromatic carbon atoms which process comprises the steps of:

(a) reacting a dihydric phenol with about a stoichiometric amount of a source of alkali metal selected from the group consisting of alkali metal hydride, hydroxide, alkoxide or alkyl compounds in the presence of an azeotrope forming solvent to form the alkali metal double salt of the dihydric phenol of the formula:

*MO—E—OM'* where M and M' are alkali metal ions selected from the group consisting of lithium, sodium, potassium and cesium ions, (b) removing water from the reacting mixture by codistillation with the azetrope forming solvent, and (c) admixing about an equimolar amount of a benzenoid compound of the formula:

*X—E—X'* where X and X' are halogen ions independently selected from the group consisting of fluorine and chlorine ions, in the presence of a monocyclic macrocyclic polyether compound having one ether ring in which oxygen atoms are joined to adjoining oxygen atoms by hydrocarbon chains having from 2 to 3 carbon atoms, the ring having fused thereto from 0 to 4 monocyclic or polycyclic aromatic or saturated hydrocarbon nuclei attached by vicinal carbon atoms thereof to adjoining ring oxygens in oxygen-carbon-carbon-oxygen arrangement, at temperatures in a range upward from about 100° C. and below the decomposition temperatures of the polymer formed, the reactants, and the macrocyclic polyether compound.

19. The process according to claim 18 wherein at least one ether ring carbon atom is $C_1$ to $C_4$ alkyl substituted.

20. The process according to claim 18 wherein the polyether compound is selected from the group consisting of 12-crown-4 ether, 15-crown-5 ether, 18-crown-6 ether, dibenzo-18-crown-6 ether, and dicyclohexano-18-crown-6 ether.

21. The process according to claim 20 wherein the alkali metal double salt is derived from a dihydric phenol selected from the group consisting of the formulae:

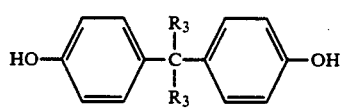

(a)

where $R_3$ represents the methyl radical,

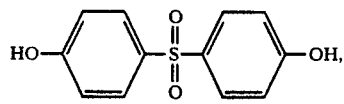

(b)

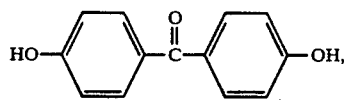

(c)

and

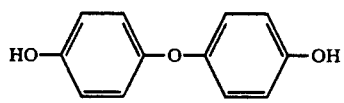

(d)

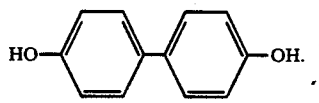

(e)

22. The process according to claim 21 wherein M and M' are lithium ions and wherein the polyether compound is 12-crown-4 ether.

23. The process according to claim 22 wherein X and X' are chlorine ions.

24. The process according to claim 23 wherein the lithium salt is derived from bisphenol-A.

25. The process according to claim 24 wherein the benzenoid compound is 4,4'-dichlorodiphenyl sulfone.

26. The process according to claim 21 wherein M and M' are sodium ions and wherein the polyether compound is 15-crown-5 ether.

27. The process according to claim 26 wherein X and X' are chlorine ions.

28. The process according to claim 27 wherein the sodium salt is derived from bisphenol-A.

29. The process according to claim 28 wherein the benzenoid compound is 4,4'-dichlorodiphenyl sulfone.

30. The process according to claim 21 wherein M and M' are potassium ions and wherein the polyether compound is selected from the group consisting of 18-crown-6 ether, dibenzo-18-crown-6 ether, dicyclohexano-18-crown-6 ether.

31. The process according to claim 30 wherein X and X' are chlorine ions.

32. The process according to claim 31 wherein the potassium salt is derived from bisphenol-A.

33. The process according to claim 32 wherein the benzenoid compound is 4,4'-dichlorodiphenyl sulfone.

34. The process according to claim 33 wherein the polyether compound is dibenzo-18-crown-6 ether.

35. The process according to claim 18 wherein the monocyclic macrocyclic polyether compound is in an immobilized form.

* * * * *

UNITED STATES PATENT AND TRADEMARK OFFICE
CERTIFICATE OF CORRECTION

PATENT NO. : 5,235,019
DATED : August 10, 1993
INVENTOR(S) : Savariar, Selvaraj

It is certified that error appears in the above-indentified patent and that said Letters Patent is hereby corrected as shown below:

| Col. | Line | |
|------|------|---|
| 14 | 22 | "weight polymers, Q but also" should read --weight polymers, but also--. |
| 18 | 33 | "-)-E-O-E'-O-" should read -O-E-O-E'-O- |
| 20 | 55 | "-)-E-O-E'-O-" should read -O-E-O-E'-O- |

Signed and Sealed this

Third Day of May, 1994

Attest:

BRUCE LEHMAN

Attesting Officer          Commissioner of Patents and Trademarks